United States Patent [19]
Eian et al.

[11] Patent Number: 5,559,198
[45] Date of Patent: Sep. 24, 1996

[54] PROCESS FOR PREPARING POLY(VINYL TRIFLUOROACETATE) AND POLY(VINYLTRIFLUOROACETATE/VINYL ESTER) COPOLYMERS IN SUPERCRITICAL $CO_2$

[75] Inventors: Gilbert L. Eian, Mahtomedi; Cheryl L. S. Elsbernd, Woodbury, both of Minn.

[73] Assignee: Minnesota Mining and Manufacturing Company, Saint Paul, Minn.

[21] Appl. No.: 273,421

[22] Filed: Jul. 8, 1994

[51] Int. Cl.$^6$ ...................................................... C08F 2/00
[52] U.S. Cl. .............................. 526/89; 526/941; 526/245
[58] Field of Search ........................................ 526/89, 941

[56] References Cited

U.S. PATENT DOCUMENTS

| | | | |
|---|---|---|---|
| 2,436,144 | 2/1948 | Howk et al. | 260/87 |
| 3,522,228 | 7/1970 | Fukui et al. | 260/94.9 |
| 4,673,539 | 6/1987 | Hammar et al. | 264/1.1 |
| 4,748,220 | 5/1988 | Hartman et al. | 526/89 |
| 5,312,882 | 5/1994 | DeSimone et al. | |
| 5,312,992 | 5/1994 | Clark et al. | 568/21 |
| 5,376,744 | 12/1994 | Kennedy et al. | 526/89 |

FOREIGN PATENT DOCUMENTS

| | | | |
|---|---|---|---|
| 1274942 | 10/1990 | Canada. | |
| 601807 | 5/1948 | United Kingdom | 526/89 |
| WO93/20116 | 10/1993 | WIPO | C08F 14/18 |

OTHER PUBLICATIONS

"Synthesis of Fluoropolymers in supercritical carbon dioxide" DeSimone et al. Science. vol. 257 14 Aug. 1992 pp. 945–947.

Billmeyer, "Textbook of Polymer Science," Second Ed., Wiley, NY (1971) p. 84.

Boock et al., Chemtech, "Reactions in Supercritical Fluids," vol. 22, (1992) p. 719.

Desimone et al., Science, vol. 257, (1992) p. 945.

Haas et al., Journal of Polymer Science, "Polyvinyl Trifluoroacetate," vol. 22, (1956) p. 291.

Pritchard et al., Journal of Polymer Science, "Fluorine NMR Spectra of Poly(vinyl Trifluoroacetate)," Part A–1, vol. 4, (1966) p. 707.

Harris et al., Journal of Polymer Science, "Structure–Property Relationships of Poly(vinyl Alchohol)," Part A–1, vol. 4, (1966) p. 665.

*Dispersion Polymerizations in Supercritical Carbon Dioxide*, J. M. DeSimone, et al., Science, vol. 265, Jul. 15, 1994.

*Dispersion Polymerization of Methyl Methacrylate:Mechanism of Particle Formation*, S. Shen, et al., pp. 1087–1100.

*Dispersion Polymerization in Organic Media*, K. E. J. Barrett, John Wiley & Sons.

*Polymeric Stabilization of Colloidal Dispersions*, Donald H. Napper, 1983, Academic Press.

*Polymer Colloids*, Edited by Robert M. Fitch, Plenum Press, 1971.

Patent Application US SN 08/272,779 filed Jul. 8, 1994 (copy not included).

*Primary Examiner*—Joseph L. Schofer
*Assistant Examiner*—N. Sarofim
*Attorney, Agent, or Firm*—Gary L. Griswold; Walter N. Kirn; Janice L. Dowdall

[57] ABSTRACT

A method for the production of poly(vinyl trifluoroacetate) and copolymers thereof with vinyl esters is described. Poly(vinyl trifluoroacetate) (PVTFA) is obtained in relatively high yield under mild conditions by using carbon dioxide under supercritical conditions as a solvent. Synthesis of syndiotactic PVTFA on a commercial scale without the use of environmentally-harmful solvents is made possible by the invention, which provides a convenient route to syndiotactic polyvinyl alcohol.

11 Claims, No Drawings

PROCESS FOR PREPARING POLY(VINYL TRIFLUOROACETATE) AND POLY(VINYLTRIFLUOROACETATE/VINYL ESTER) COPOLYMERS IN SUPERCRITICAL $CO_2$

FIELD OF THE INVENTION

This invention relates to a method of polymerizing vinyl trifluoroacetate ($CF_3COOCH=CH_2$) and optional vinyl ester comonomers in the presence of supercritical carbon dioxide to prepare highly syndiotactic poly(vinyl trifluoroacetate) with high to medium molecular weight as represented by an inherent viscosity of greater than about 0.30 dl/g and a yield of greater than about 45%.

BACKGROUND OF THE INVENTION

Poly(vinyl trifluoroacetate) has commercial importance as a precursor to highly syndiotactic poly(vinyl alcohol) hydrogels, which themselves are commercially important as materials for, e.g., contact lenses, membranes, and as coatings for polymeric and non-polymeric substrates such as membranes. Heretofore, the polymerization of vinyl trifluoroacetate has posed a number of significant problems.

Poly(vinyl trifluoroacetate) with high molecular weight has been prepared by free radical bulk polymerization (U.S. Pat. No. 2,436,144) but the process is not workable on a large scale due to the exothermic character of the reaction. The reaction mixture sets to a gel at low conversion because the polymer is insoluble in, but swollen by, the monomer.

Polymerization of vinyl trifluoroacetate in common organic solvents has been described. Haas et al., *Journal of Polymer Science*, Vol. 22, p. 291 (1956) describe a reaction in acetone resulting in a low molecular weight material. Pritchard et al., *Journal of Polymer Science*, Part A-1, Vol. 4, p. 707 (1966) describe synthesis in n-heptane at 80° C. with low conversion and in carbon tetrachloride at −50° C., also with low conversion. Harris et al., *Journal of Polymer Science*, Part A-1, Vol. 4 p. 665 (1966) describe a reaction in n-heptane at −78° C. to give a high molecular weight polymer. Such low temperature reaction conditions are difficult to maintain on a commercial scale.

Polymerization of vinyl trifluoroacetate in inert chlorofluorocarbon solvents such as that available under the trademark FREON 113 has been described by Gagnon, et al. in pending U.S. patent application Ser. No. 07/005,969, filed Nov. 8, 1991, assigned to the assignee of the present invention, which is a continuation-in-part of the following U.S. patent application Ser. Nos.: 07/605,754; 07/606,757; 07/605,828; 07/605,834; 07/605,921; and 07/605,948; all filed Oct. 30, 1990. A similar synthesis was described by Hammar et al. in U.S. Pat. No. 4,673,539, assigned to the assignee of the present invention, with the exception that Hammar et al. did not use trifluoroacetic anhydride as a water scavenger. Commercial use of such chlorofluorocarbon solvents is severely restricted for environmental reasons.

Polymerization of vinyl trifluoroacetate in siloxanes and perfluorinated solvents has been described by Eian in pending U.S. patent application Ser. No. 08/152,393, assigned to the assignee of the present invention, filed Nov. 12, 1993. While use of these solvents allows preparation of poly(vinyl trifluoroacetate) on a commercial scale, these solvents are expensive. Also, the siloxanes are flammable.

The starting monomer (vinyl trifluoroacetate) for poly(vinyl trifluoroacetate) is extremely moisture sensitive. Polymerization of vinyl trifluoroacetate by aqueous emulsion or suspension techniques is not possible because hydrolysis of the monomer competes with polymerization of the monomer. Even small amounts of water must be avoided because acetaldehyde, formed as a hydrolysis product, acts as an inhibitor of the chain polymerization reaction.

Supercritical fluids have been used as extraction and chemical reaction media because of the range of properties such as density, diffusivity, viscosity, cohesive energy density, surface tension, etc. which can be adjusted by simply changing the pressure [L. Boock, et al., *CHEMTECH*, Vol. 22, p. 719 (1992)]. Generally the supercritical fluids are advantageously used to selectively solubilize certain materials in the presence of others, to dissolve materials that are otherwise difficult to dissolve, and to provide a simple and efficient means of isolating solubilized material when pressure is released.

Fukui, et al. (U.S. Pat. No. 3,522,228) describe a method for polymerizing a vinyl compound in the presence of a carbon dioxide medium. This description includes supercritical and non-supercritical reaction conditions for $CO_2$. Although Fukui, et al. describe the reaction of a variety of vinyl compounds in liquid carbon dioxide, there is no reference to the polymerization of any moisture sensitive monomers such as vinyl trifluoroacetate under supercritical or non-supercritical conditions nor is there any detailed reference to the polymerization of fluorinated monomers other than passing reference to tetrafluoroethylene (which is not a moisture sensitive monomer). Knowing the difficulty in achieving poly(vinyl trifluoroacetate) of reasonable molecular weight, one skilled in the art would assume that the process described by Fukui et al. would not be suitable for preparing this polymer.

Desimone, et al. (*Science*, Vol. 257, p. 945 (1992) and International Publication No. WO 93/20116(14.10.93) discuss the homogeneous free radical polymerization of highly fluorinated vinyl monomers in supercritical carbon dioxide. The polymerization described by Desimone proceeds because the reaction mixture (i.e. monomer, polymer and initiator) remains homogenous. Desimone teaches that the reaction mixture needs to remain homogeneous during the entire course of the polymerization to obtain a polymer of reasonable molecular weight.

U.S. Pat. No. 5,312,882 discloses a heterogeneous emulsion or suspension polymerization of water insoluble monomer in $CO_2$ in the presence of a surfactant. The patent describes polymerization of monomers in a discontinuous phase where $CO_2$ is the continuous phase.

SUMMARY OF THE INVENTION

Thus, there is a need for a method of polymerizing vinyl trifluoroacetate (VTFA) and a method of copolymerizing vinyl trifluoroacetate with vinyl ester monomer(s) in a commercially and environmentally acceptable manner to produce a polymer in high yield exhibiting a high inherent viscosity, i.e., a high molecular weight. We have discovered such a method.

The present invention relates to a method for the (co)polymerization of vinyl trifluoroacetate monomer, comprising the steps of:

(a) preparing a mixture comprising:
  (i) vinyl trifluoroacetate monomer;
  (ii) optionally, vinyl ester monomer(s);

(iii) supercritical fluid $CO_2$ solvent; and
(iv) a peroxydicarbonate free-radical polymerization initiator;

(b) activating the mixture to effect polymerization of the monomer and form a (co)polymer, while maintaining supercritical fluid $CO_2$ conditions.

The method of the present invention is a precipitation polymerization. The polymerization mixture is initially homogeneous but the polymer precipitates as the reaction proceeds. Poly(vinyl trifluoracetate) (PVTFA) is obtained in high yield under mild conditions by using $CO_2$ under supercritical conditions as the reaction medium. Preferably the reaction mixture consists essentially of the components of elements (i), (iii), and (iv), and optionally (ii). Most preferably the reaction mixture consists of the components of elements (i), (iii), and (iv), and optionally (ii). The polymers prepared according to the method of the invention typically exhibit inherent viscosities greater than about 0.3 dl/g, more typically about 0.5 to about 1 dl/g. Synthesis of syndiotactic PVTFA on a commercial scale without the use of environmentally-harmful solvents is made possible by the invention, which provides a convenient commercial route to syndiotactic poly(vinyl alcohol). Copolymerization of vinyl trifluoroacetate monomer with vinyl ester monomers is possible according to the method of the invention by including vinyl ester monomer in the mixture of element (a).

Various useful concentrations and parameters of the reaction are described in detail below.

DETAILED DESCRIPTION OF THE INVENTION

I. Solvent

Supercritical fluid $CO_2$ solvent is advantageous for a number of reasons. First, unlike chlorofluorocarbons, it is not detrimental to atmospheric ozone. Second, it is very effective in allowing or promoting adequate chain propagation of vinyl trifluoroacetate and any comonomers to achieve a desired molecular weight or inherent viscosity. Third, it does not have the flammability problems associated with other solvents. Fourth, it does not persist detrimentally in the environment.

Supercritical fluid conditions are well understood by those skilled in the art. For $CO_2$ the supercritical temperature is 31.3° C. and the supercritical pressure is 72.9 atmosphere (70.6 $Kg/cm^2$). To maintain supercritical conditions, one must operate above both the critical pressure and critical temperature of $CO_2$.

II. Vinyl Trifluoroacetate Monomer

Vinyl trifluoroacetate monomer can be obtained by a modification of the procedure described in U.S. Pat. No. 2,436,144. Trifluoroacetic acid and acetylene are allowed to react in the presence of red mercuric oxide and trifluoroacetic anhydride, after which the desired vinyl trifluoroacetate is separated from unreacted starting materials, then distilled. Vinyl trifluoroacetate monomer is also available commercially.

III. Optional Vinyl Ester Comonomers

Copolymers of vinyl trifluoroacetate and vinyl esters (typically formed from about $C_1$ to about $C_{20}$ carboxylic acids) are also prepared by the method of the invention. Preferred vinyl esters are those of the general formula R—COO—CH=$CH_2$, wherein R represents a linear, or branched, or cyclic hydrocarbon segment comprising from about 1 to about 20 carbon atoms. Examples of such vinyl esters include but are not limited to those selected from the group consisting of vinyl acetate, vinyl propionate, vinyl butyrate, vinyl pivalate, vinyl 2-ethylhexanoate, vinyl neononate, vinyl neodecanoate, vinyl stearate, and mixtures thereof.

The concentration range of monomeric vinyl trifluoracetate plus optional vinyl ester comonomer in the reaction mixture (the vinyl trifluoroacetate, solvent, initiator, plus optional vinyl esters and any other optional components in the reaction mixture) for the polymerization reactions of this invention is typically from about 5 to about 60 volume percent, based on the total volume of the reaction mixture. Preferably, a total monomer concentration range of from about 10 to about 50 volume percent is used, most preferably about 15 to about 40 volume percent based upon the total volume of the reaction mixture in order to obtain a preferred polymer. If too dilute a concentration is used, the resulting polymer will have an undesirably low molecular weight. If the reaction mixture is too concentrated, adequate agitation is not possible. The reaction mixture typically comprises about 40 to about 95 volume percent solvent based upon the total volume of the mixture, preferably about 50 to about 90 volume percent, most preferably about 60 to about 85 volume percent.

The polymers of the invention can be formed from a monomer charge comprising about 1 to about 100 percent by weight vinyl trifluoroacetate monomer and about 0 to about 99 percent by weight vinyl ester monomer based upon the total weight of the monomer. Copolymers of vinyl trifluoroacetate and vinyl esters can be prepared in relative concentrations of from about 0.1 to about 99 weight percent vinyl ester and about 1 to about 99.9 weight percent vinyl trifluoroacetate, based on total monomer weight. Typically, vinyl trifluoroacetatevinyl ester copolymers comprise from about 0.1 to about 20 weight percent vinyl ester and about 80 to about 99.9 weight percent vinyl trifluoroacetate, preferably from about 0.2 to about 10 weight percent vinyl ester and about 90 to about 99.8 weight percent vinyl trifluoroacetate, and most preferably from about 0.25 to about 5 weight percent vinyl ester and about 95 to about 99.75 weight percent vinyl trifluoroacetate, based on the total weight of the monomers from which the copolymer is formed.

Copolymers of vinyl trifluoroacetate and other vinyl esters are useful in a number of applications. The incorporation of small amounts of vinyl acetate renders a copolymer having modified physical characteristics, such as water solubility and water swellability. When vinyl esters are copolymerized with vinyl trifluoroacetate, selective hydrolysis of the trifluoroacetate moieties is possible, generating poly(vinyl alcohol)-poly(vinyl ester) copolymers.

IV. Free-Radical Initiator

Peroxydicarbonate free-radical polymerization initiators are required according to the method of the present invention. An example of a useful peroxydicarbonate initiator is di(4-t-butylcyclohexyl)peroxydicarbonate (available under the trademark PERKADOX™16 from AKZO Chemicals). Examples of other useful peroxydicarbonate initiators include but are not limited to those selected from the group consisting of dicetylperoxydicarbonate, di-(sec-butyl)peroxydicarbonate, di-(2-ethylhexyl)peroxydicarbonate and dimyristyl peroxydicarbonate. Such peroxydicarbonate initiators provide polymers with a good yield and inherent viscosity.

Preferably, di(4-t-butylcyclohexyl)peroxydicarbonate is selected as the initiator due to its lower decomposition temperature and its ease of handling. Preferably, the initiator decomposes at a temperature of between about 40° C. and about 60° C., in order to obtain (co)polymer of usefully high inherent viscosity. The amount of initiator used typically ranges from about 0.1 to about 5 weight percent, preferably about 0.2 to about 2 weight percent, and most preferably from about 0.2 to about 1 weight percent, based on the weight of the vinyl trifluoroacetate monomer plus optional vinyl ester monomer used. The use of a minimum amount of initiator relative to amount of monomer produces desirably higher molecular weight in the resultant (co)polymer.

We have found that other free radical initiators (azo initiators for example) do not provide the same good yield and high inherent viscosity as the initiators used according to the present invention.

V. Method of (Co)Polymerization

The (co)polymerization method of the invention is typically as follows. A mixture is prepared of the monomers, and initiator. The monomer and initiator components may be charged to a suitable reaction vessel in any order. Typically $CO_2$ (liquid) is charged to a closed reaction vessel already containing the monomer and initiator. The temperature and pressure are adjusted such that both are over their respective critical values for $CO_2$ and the $CO_2$ is in supercritical fluid form. The mixture is activated to effect (co)polymerization. This is typically caused by the application of heat, along with agitation. (Co)polymerization typically occurs over about 4 to about 24 hours, typically at about 35° C. to about 60° C. and a pressure of about 3000 psi (211 Kg/cm$^2$) to about 8000 psi (562 Kg/cm$^2$) depending upon the components selected and their concentrations. The (co)polymerization typically continues until about 50 to 100% conversion occurs. The (co)polymer rpecipitates out as it is formed. The (co)polymer is typically collected by venting the reaction vessel and physically removing the solid (co)polymer.

TEST METHOD

Inherent Viscosity (IV) Measurement

The inherent viscosity of a polymer solution is well-known in the art as a useful measure of polymer molecular weight, and is defined as the ratio of the in of the relative viscosity to the polymer concentration. (See "Textbook of Polymer Science," Second Edition; by F. W. Billmeyer, Jr., Wiley (New York), 1971, p. 84, incorporated by reference herein.) Inherent viscosities were measured in methyl ethyl ketone solvent using a Cannon-Fenske tube at 27° C., at a nominal concentration of 0.2 g/dl and are reported in units of dl/g.

EXAMPLES

The following Examples further illustrate but do not limit the present invention. All parts, percentage, ratios, etc. in the Examples and the rest of the specification are by weight unless indicated otherwise.

Preparation of Vinyl Trifluoroacetate Monomer

Two identical batches of vinyl trifluoroacetate monomer were prepared, as follows:

A mixture of 912 g trifluoroacetic acid and 102 g red mercuric oxide was stirred at 30° C. for 30 minutes, then treated with 46 g trifluoroacetic anhydride. Under continuous stirring at a reaction temperature of between 35° C. and 40° C., acetylene was bubbled into the above mixture at such a rate that excess acetylene did not escape the reaction mixture. When the reaction solution was observed to be saturated, acetylene addition was discontinued. The temperature of the reaction vessel was raised to 50° C., and vinyl trifluoroacetate was collected by distillation. Gas chromatographic analysis of the crude vinyl trifluoroacetate indicated the presence of about 4.5 percent trifluoroacetic anhydride, which was carefully hydrolyzed by stirring with 9 g water.

The two identical crude reaction products were combined and distilled to give a total of 1143 g vinyl trifluoroacetate of greater than 99.8% purity.

Example 1—Preparation of poly(vinyl trifluoroacetate)

Into a 10 mL high pressure view cell containing a magnetic stir bar and equipped with a ball valve, was charged 0.008 gram (0.02 mmol) of solid initiator, Perkadox™ 16, di(4-5-butylcyclohexyl)peroxydicarbonate. The cell opening was then sealed with a sapphire window. Using a syringe, 3 mL (25.7 mmol) of vinyl trifluoroacetate was added through a septum on the ball valve at the top of the cell. The cell was purged with nitrogen for about 10 minutes, filled with liquid $CO_2$ to ~2560 psig (180 Kg/cm$^2$) then sealed. The cell was heated to 45° C. resulting in supercritical $CO_2$ conditions within the cell and the pressure was increased to 5100 psig (358 Kg/cm$^2$) by the further addition of liquid $CO_2$. The clear homogeneous mixture was allowed to react for 16 hours at the stated temperature and pressure. During the course of the reaction a white powdery polymer product was formed. After 16 hours, the cell was cooled to room temperature and the $CO_2$ was carefully vented. The powdery white polymer was recovered from the cell and dried to constant weight in a vacuum oven at 60° C. The yield was found to be 68% (2.7275 grams) and the polymer was characterized by inherent viscosity (IV) in methyl ethyl ketone (IV=0.774).

Comparative Example 2a and Example 2b—Preparation of P(VTFA) at Various Temperatures To compare percent conversions and IVs of poly(vinyl trifluoroacetate) prepared at various temperatures, the general method of Example 1 was repeated except that the reaction was carried out at 25° C. (non-supercritical conditions Comparative Example 2a) and 60° C. (critical conditions, Example 2b).

For both comparative Example 2a and Example 2b the reactions had a monomer concentration of 30%, based on total volume of the reaction mixture and an initiator concentration of 0.22% based on monomer weight. The results of these reactions are shown in Table 1.

Example 3—Preparation of P(VTFA) with High Initiator Concentration

To compare percent conversion and IV of poly(vinyl trifluoroacetate) prepared with a high amount of initiator present, the general method of Example 1 was repeated except that the initial charge of initiator (Perkadox™ 16) was 0.016 gram or 0.44% based on monomer weight. The results of this reaction are shown in Table 1.

Comparative Example 4—Preparation of P(VTFA) with AIBN

To compare percent conversion and IV of poly(vinyl trifluoroacetate) prepared with a different initiator, the general method of Example 1 was repeated except that the initiator charge was 0.0105 gram of 2,2'-azobis(2-methylpropane nitrile) (AIBN) (available under the Trademark Vazo™ 64 from DuPont) or 0.30% based on monomer weight. Additionally, this reaction was run at 67° C. The results of this reaction are shown in Table 1.

Example 5—Preparation of Vinyl Trifluoroacetate/Vinyl Ester Copolymer

A copolymer comprising the polymerization product of vinyl trifluoroacetate and vinyl ester comonomer was prepared. The general method of Example 1 was repeated except that the monomer charge was a mixture of 0.36 gram (1.96 mmol) Vinate Neo 9 (vinyl ester of a branched $C_9$ carboxylic acid from Union Carbide Corporation) and 3.58 grams (25.6 mmol) vinyl trifluoroacetate. The resulting product was a tough, white, spongy polymer. The results of this reaction are shown in Table 1.

TABLE 1

| Example | Initiator | % Initiator | Temp. (°C.) | % Yield | IV (dl/g) |
|---|---|---|---|---|---|
| 1 | Perkadox ™ 16 | 0.22 | 45 | 68 | 0.774 |
| Comp. 2a | Perkadox ™ 16 | 0.22 | 25 | 11 | 0.S24 |
| Comp. 2b | Perkadox ™ 16 | 0.22 | 60 | 64 | 0.392 |
| 3 | Perkadox ™ 16 | 0.44 | 45 | 77 | 0.485 |
| Comp. 4 | AIBN | 0.30 | 67 | 24 | 0.467 |
| 5* | Perkadox ™ 16 | 0.22 | 45 | 51 | 0.530 |

*(copolymer)

Examples 1, 2b, 3 and 5 in which peroxydicarbonate initiator is used and supercritical conditions were maintained resulted in both high percent yield and good inherent viscosity. Comparative Example 2a involved the use of a peroxydicarbonate initiator but supercritical conditions were not employed. Although inherent viscosity was good the percent yield was very low (11%). Comparative Example 4 involved the use of an azo initiator rather than a peroxydicarbonate initiator, under supercritical conditions. Poor yield was obtained (24%). Thus, the data in Table 1 demonstrate the necessity of using peroxydicarbonate initiator and maintaining supercritical conditions to obtain good yield.

While this invention has been described in connection with specific embodiments, it should be understood that it is capable of further modification. The claims herein are intended to cover those variations which one skilled in the art would recognize as the chemical equivalent of what has been described herein.

What is claimed is:

1. A method for the free-radical (co)polymerization of vinyl trifluoroacetate monomer comprising the steps of;
   (a) preparing a homogeneous mixture comprising:
      (i) vinyl trifluoroacetate monomer;
      (ii) optionally, vinyl ester monomer(s);
      (iii) supercritical fluid $CO_2$ solvent;
      (iv) a peroxydicarbonate free-radical polymerization initiator; and
   (b) activating the mixture to effect precipitation (co)polymerization of the monomers and form a (co)polymer, while maintaining supercritical fluid $CO_2$ conditions.

2. The method of claim 1 which further comprises the step of collecting said (co)polymer.

3. The method of claim 1 which further comprises the step of hydrolyzing said (co)polymer.

4. The method of claim 1 wherein the free-radical polymerization initiator is di(4-t-butylcyclohexyl)peroxydicarbonate.

5. The method of claim 1 wherein said mixture comprises:
   (i) about 1 to about 100 weight percent of the vinyl trifluoroacetate;
   (ii) about 0 to about 99 weight percent of the vinyl ester;
   wherein the percentages of (i) and (ii) are based upon the total weight of (i) plus (ii); and wherein the mixture comprises about 5 to about 60 volume percent total monomer based upon the total volume of the mixture;
   (iii) about 40 to about 95 volume percent of the solvent based upon the total volume of the mixture; and
   (iv) about 0.1 to about 5 weight percent of the polymerization initiator based upon the total weight of the monomer.

6. The method of claim 1 wherein said mixture comprises:
   (i) about 1 to about 100 weight percent of the vinyl trifluoroacetate;
   (ii) about 0 to about 99 weight percent of the vinyl ester;
   wherein the percentages of (i) and (ii) are based upon the total weight of (i) plus (ii); and wherein the mixture comprises about 10 to about 50 volume percent total monomer based upon the total volume of the mixture;
   (iii) about 50 to about 90 volume percent of the solvent based upon the total volume of the mixture; and
   (iv) about 0.2 to about 2 weight percent of the polymerization initiator based upon the total weight of the monomer.

7. The method of claim 1 wherein said mixture comprises:
   (i) about 1 to about 100 weight percent vinyl trifluoroacetate;
   (ii) about 0 to about 99 weight percent vinyl ester;
   wherein the percentages of (i) and (ii) are based upon the total weight of (i) plus (ii); and
   wherein the mixture comprises about 15 to about 40 volume percent total monomer based upon the total volume of the mixture;
   (iii) about 60 to about 85 volume percent of the solvent based upon the total volume of the mixture;
   (iv) about 0.3 to about 1 weight percent of the polymerization initiator based upon the total weight of the monomer.

8. The method of claim 1 wherein about 80 to about 99.9 percent by weight e vinyl trifluoroacetate monomer of thand about 0.1 to about 20 percent by weight of the vinyl ester monomer is present based upon the total monomer weight.

9. The method of claim 1 wherein about 90 to about 99.8 percent by weight of the vinyl trifluoroacetate monomer and about 0.2 to about 10 percent by weight of the vinyl ester monomer is present based upon the total monomer weight.

10. The method of claim 1 wherein about 95 to about 99.7 percent by weight of the vinyl trifluoroacetate monomer and about 0.25 to about 5 percent by weight of the vinyl ester monomer is present based upon the total monomer weight.

11. The method of claim 1, wherein the (co)polymerization occurs at a pressure of about 3000 to about 8000 psi and at a temperature of about 35 to about 60° C.

* * * * *